United States Patent [19]

Timmerman et al.

[11] 3,862,866

[45] Jan. 28, 1975

[54] GAS GENERATOR COMPOSITION AND METHOD

[75] Inventors: Hubert G. Timmerman, Manhattan Beach; Vincent O. Catanzarite, Las Vegas, both of Calif.

[73] Assignee: Specialty Products Development Corporation, Oak Creek, Wis.

[22] Filed: Aug. 2, 1971

[21] Appl. No.: 167,943

[52] U.S. Cl............... 149/21, 23/281, 149/77, 149/113, 252/187 R, 252/188.3 R, 280/150 AB, 149/85
[51] Int. Cl....... B01j 7/00, C06d 5/06, C06b 11/00
[58] Field of Search............ 252/188.3 R, 187 R; 280/150 AB; 23/281; 149/42, 44, 113, 21, 85

[56] References Cited
UNITED STATES PATENTS

| | | | |
|---|---|---|---|
| 3,393,639 | 7/1968 | Bolieau et al. | 102/39 X |
| 3,477,955 | 11/1969 | Hiltz | 252/188.3 R |
| 3,527,472 | 9/1970 | Chute et al. | 280/150 AB |
| 3,532,360 | 10/1970 | Leising et al. | 23/281 X |
| 3,647,393 | 3/1972 | Leising et al. | 280/150 AB |
| 3,618,981 | 11/1971 | Leising et al. | 102/39 |
| 3,624,810 | 11/1971 | Hass | 280/150 AB |
| 3,642,304 | 2/1972 | Johnson et al. | 280/150 AB |
| 3,655,217 | 4/1972 | Johnson | 280/150 AB |
| 3,666,289 | 5/1972 | Magyar | 280/150 AB |
| 3,674,284 | 7/1972 | Lohr | 280/150 AB |
| 3,680,886 | 8/1972 | Mazelsky | 280/150 AB |
| 3,773,351 | 11/1973 | Catanzarite | 280/150 AB |
| 3,797,854 | 3/1974 | Poole et al. | 280/150 AB |

*Primary Examiner*—Benjamin R. Padgett
*Assistant Examiner*—Irwin Gluck
*Attorney, Agent, or Firm*—Christie, Parker & Hale

[57] ABSTRACT

A deflagrating composition yielding a gas comprising principally carbon dioxide and water vapor comprises a substantially homogeneous mixture of powders preferably having an average particle size less than about 25 microns. The composition has an oxygen bearing oxidizing powder and an organic reducing powder having the formula $C_xH_yO_z$, having a melting point greater than about 165°F, and a sufficiently low vapor pressure to have no more than a minute amount of sublimation prior to oxidation by the oxidizing powder upon ignition. The oxidizing powder and reducing power or "fuel" are sufficiently near stoichiometry to produce a gas comprising principally carbon dioxide and water vapor upon combustion for inflation of an automobile restraint bag with a non-toxic, at least partly condensable gas. In one embodiment the mixture further comprises an endothermic decomposition coolant having a thermal decomposition product selected from the class consisting of carbon dioxide and water and decomposable below the combustion temperature of the mixture. A method of this invention comprises inflation of a gas bag by combustion of a mixture like that described above. In one embodiment, the mixture may include a reducible metal oxide having a decomposition temperature in the same range as ferric oxide. In another embodiment the mixture is burned adjacent a reservoir of water for producing vapor for inflating the bag, to be followed by rapid deflation as the vapor condenses.

6 Claims, 2 Drawing Figures

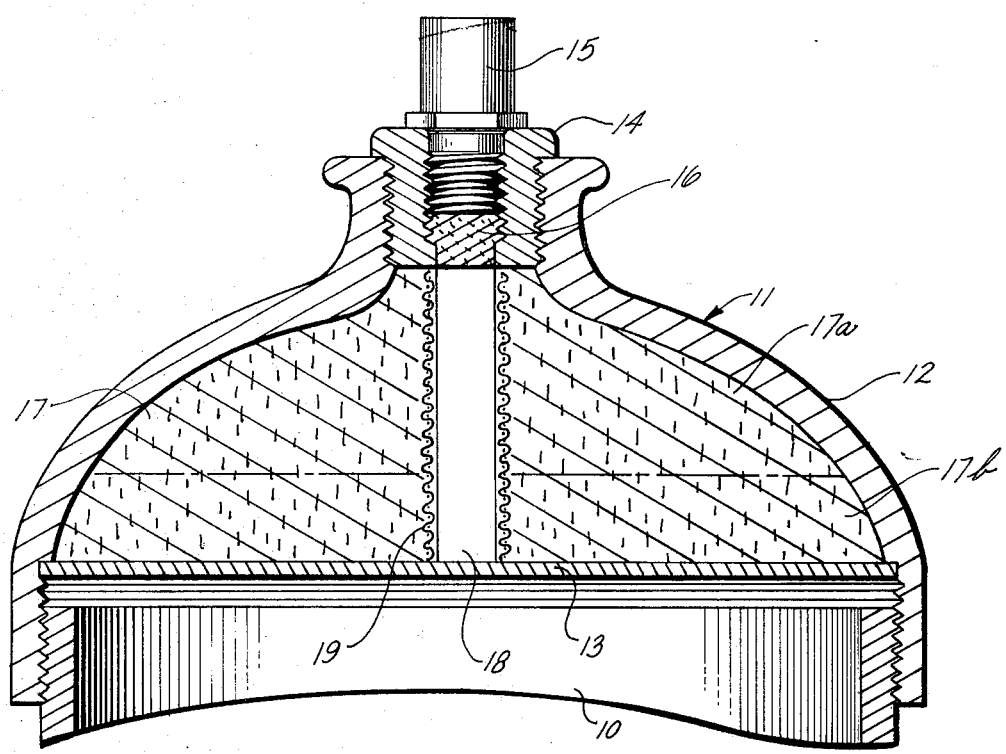
FIG_1
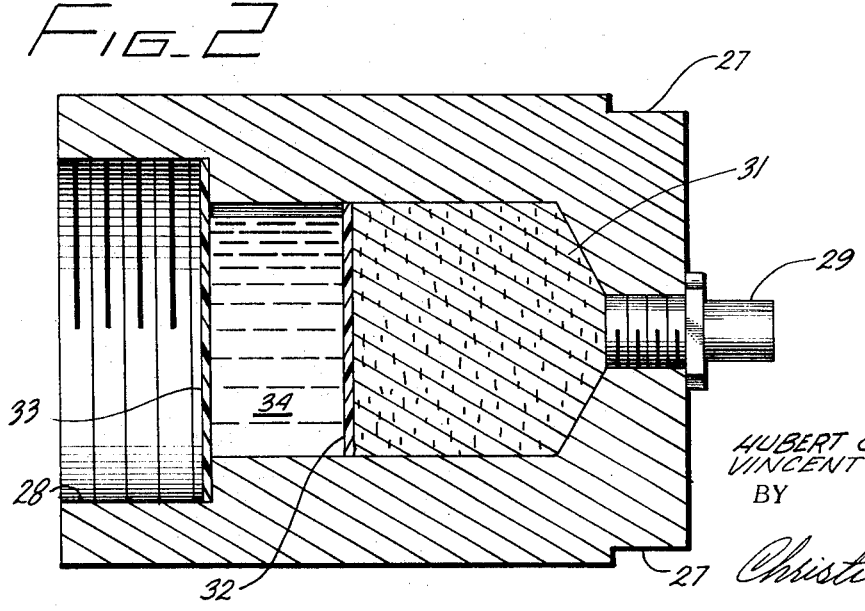
FIG_2
INVENTORS.
HUBERT G. TIMMERMAN
VINCENT O. CATANZARITE
BY
Christie, Parker & Hale
ATTORNEYS

GAS GENERATOR COMPOSITION AND METHOD

BACKGROUND

Governmental requirements have been proposed for automobile passenger restrain systems including an inflatable bag that momentarily and temporarily restrains a passenger during the critical instant of a collision impact. Typically, the inflatable bag is deployed and is inflated to its maximum pressure in about 20 milliseconds (ms). Thereafter, in order to prevent pinioning of a passenger in the automobile, deflation of the bag after about 100 ms may be required.

In order to provide the rapid inflation and subsequent deflation of an automobile passenger restraint bag, a variety of approaches have been explored. One of these is to provide a reservoir of compressed gas that is discharged into the bag when a sensor detects a collision, In order to deflate the bag, a blowout panel or burst diaphragm may be employed for releasing the gas from within the bag. Many problems are associated with the high pressure gas systems such as, for example, programming the time/pressure history of bag inflation and deflation for optimum collision protection and smooth bag deployment.

Another approach is to provide a pyrotechnic propellant that, upon ignition, generates a volume of hot gases that inflate the bag. The difficulty with most pyrotechnic propellants is that in order to sustain combustion at a rapid constant rate, the reaction must proceed at elevated pressure. In order to obtain such elevated pressure, the reaction is conducted in a pressure vessel and discharged through a small precisely controlled orifice area in which a standing shockwave is produced. Such systems are undesirable because of the high pressures involved and the difficulty of programming the time/pressure relation of the reaction. In addition the products of the reaction include a variety of toxic gases which are obviously undesirable in a passenger compartment of an automobile.

Another approach that has been explored is "open" burning wherein the pyrotechnic mixture is ignited and burns at relatively low pressures so that a high pressure vessel is not required. A proposed pyrotechnic mixture for such a gas generator is low sulphur black powder either along or mixed with ammonium oxalate. Even with such a system, a pressure resistant diaphragm has been employed, giving some pressurization before gas flows to the bag. The psychological factor of having charges of black powder distributed in each automobile is not to be ignored. The gas temperature from black powder is high. Furthermore, the reaction products include many toxic gases.

It is therefore desirable to provide a composition that burns to produce essentially non-toxic gases for inflating a gas bag in a very short time interval and with gases that are sufficiently cool that there is substantially no danger of passenger burning in case of a leak in the gas bag.

BRIEF SUMMARY OF THE INVENTION

Therefore, in practice of this invention according to a presently preferred embodiment, there is provided a deflagration composition for generating a gas comprising principally carbon dioxide and water vapor comprising a substantially homogeneous mixture of an oxygen bearing oxidizing powder and an organic reducing powder both being solid below about 165°F., the proportion of oxidizing and reducing powders being sufficiently near stoichiometry to produce a gas comprising principally carbon dioxide and water vapor, and an endothermic decomposition coolant powder havng a thermal decomposition product selected from the class consisting of carbon dioxide and water. The powders have a particle size below about 25 microns and are preferably compacted at a pressure less than about 5000 psi. A mixture of oxidizing powder and reducing powder may be used to heat water to vaporization for inflating a bag.

DRAWINGS

These and other features and advantages of the present invention will be appreciated as the same becomes better understood by reference to the following detailed description of presently preferred embodiments when considered in connection with the accompanying drawings wherein:

FIG. 1 illustrates in transverse cross-section a gas generator employing a composition embodying principles of this invention; and FIG. 2 illustrates another gas generator cartridge wherein a pyrotechnic composition vaporizes water.

DESCRIPTION

FIG. 1 illustrates in longitudinal cross-section a typical gas generator charged with a composition embodying principles of this invention. As illustrated in this presently preferred embodiment, a cylindrical conduit 10 leads from a gas generator cartridge 11 to a conventional gas bag (not shown) such as employed for an automobile passenger restraint system. A suitable gas distribution system and additional details of a gas generator cartridge are set forth in greater detail in copending U.S. Pat. application Ser. No. 167,944 now U.S. Pat. No. 3,773,351, entitled *Gas Generator*, by Vincent Catanzarite. The teachings of the aforementioned copending patent application are hereby incorporated by reference for full force and effect as if set forth in full herein.

The gas generator cartridge 11 comprises a steel housing 12 threaded onto the gas conduit 10. A simple and economical arrangement employs conventional 2-inch Schedule 10 steel pipe for the conduit 10 and a conventional 2-inch to ½-inch pipe reducer for the container 12. About 60 grams of the deflagration composition are readily accommodated in such a container which is sufficient for inflating a 10 cubic foot automobile restraint bag. A closure membrane 13 which may be a thin sheet of plastic, synthetic mica, steel, aluminum or the like is hermetically sealed within the larger end of the container 12 to prevent interaction of the composition within the gas generator cartridge with the ambient environment. If a steel membrane 13 is used for the closure, it may be welded within the container 12 and the sheet is preferably scored so as to rupture under low pressure along preselected lines for minimizing the possibility of fragmentation when the closure is opened. If a plastic, aluminum, or mica sheet is employed for the closure 13, it may be brazed or adhesively bonded to the container 12 or, if desired, an organic sealant at the periphery of the closing membrane 13 may be used. The membrane is preferably connected to the container 12 for best sealing of the smallest volume, however, a hermetic seal can be provided elsewhere if desired since it is not necessary to provide any pressure confinement of the deflagration composition.

The the opposite end of the container 12, an adapter 14 is screwed into the -inch pipe threads. A conventional high current bridge wire initiator or "squib" 15 is threaded into the adaptor. The conventional initiator has a "bridge wire" (not shown) which is heated by an electric current when it is desired to initiate the gas generating reaction. About 30 to 50 milligrams of a mixture of relatively high purity zirconium powder and potassium perchlorate powder is provided around the bridge wire. When a sufficient current is passed through the bridge wire, the mixture is heated to a sufficient temperature that the zirconium and potassium perchlorate react to generate a considerable amount of heat. This raises the temperature within the initiator sufficiently to ignite a composition therein embodying principles of this invention. About 150 milligrams of this latter composition are provided within the initiator and in a preferred embodiment this composition comprises about 150 milligrams of a mixture in the proportion of about 8 mols of potassium chlorate to 1 mol of a mixture of about 97 percent sucrose powder and 3 percent starch powder. Such a mixture is readily made by combining powdered potassium chlorate with ordinary commercially available powdered sugar. Although this composition is preferred in the igniter, other similar compositions hereinafter described in greater detail may be substituted as desired. If desired, instead of a hot bridge wire initiator, a conventional exploding bridge wire initiator can be used for greater safety.

The conventional initiator is hermetically sealed at its forward end by a thin metal sheet or the like which is ruptured when the compositions within the initiator are ignited by the bridge wire with a consequent production of a substantial volume of hot gas. The hot gas ruptures the metal sheet across the face of the initiator due to the increased pressure, breaking it along scored lines or, if the metal is of relatively low melting point, it may be softened to the point that the entire sheet is expelled from the initiator.

A small amount of gas generating composition 16 is tamped into the cavity in the adapter 14 and, if desired, into a portion of the necked down end of the container 12. Typically, about ½ to 1½ grams of the composition may be present in this region. The principal portion of the container 12 is filled with a tamped gas generator mixture 17, the composition of which is set out in greater detail hereinafter. This mixture 17 is provided with an axial passage 18 which is typically about ¼-inch diameter extending from the tamped gas generator body 16 to the hermetic closure 13. An aluminum screen 19 may be embedded in the gas generator mixture 17 around the passage 18 in order to increase the resistance of the mixture to damage due to vibration.

The body 17 of gas generator mixture may be placed in the container 12 by wrapping the aluminum screen 19 around a rod (not shown) having the diameter of the desired passage 18. The powdered mixture is then tamped firmly into place around the rod and in the container 12. A portion of the powder sifts through the screen 19 and packs firmly around the rod so that only a small amount of the powder may be dislodged during vibration. After tight tamping of the powder within the container, the rod may be withdrawn and the closure 13 sealed in place. If desired, in order to maintain the form of the passage 18, a small amount of adhesive for firmly bonding the powder surrounding the passage may be added from the surface of the rod or by application after the rod is removed. It will be apparent that instead of tamping the mixture into the container 12, a preformed pellet having a desired configuration can be made in an ordinary pelleting press for insertion into the container. Such an arrangement may be advantageous in some circumstances since the pressure applied to the powder in the pelleting press may be higher than available in the tamping operation. Typically, in order to fill the container 12 and provide a sufficient volume of gas upon ignition of the gas generator composition, about 60 grams of mixture may be employed with somewhat larger or smaller quantities as required in order to inflate a passenger restraint bag of a selected size and in a selected time interval.

The mixture within the container is one that deflagrates when raised to its auto-ignition temperature whether or not it is at elevated pressure. The composition does not detonate, that is, the propagation velocity of the flame front through the composition is less than the sonic velocity. Further, the composition upon deflagration produces gases and vapors which are essentially non-toxic. The composition includes an oxygen bearing oxidizing powder, an organic reducing powder, and an endothermic decomposition coolant powder, the gaseous decomposition products of which are selected from the class consisting of carbon dioxide and water. Hereinafter, the oxidizing powder may be referred to as an oxidizer and the organic reducing powder may be referred to as a fuel.

The preferred oxidizing powders are selected from the class consisting of the chlorates and perchlorates of the alkali and alkaline earth metals and more specifically the preferred oxidizers are from the group of potassium chlorate, potassium perchlorate, sodium chlorate, and sodium perchlorate. These compounds have a substantial amount of oxygen that is readily released for reaction with the organic fuels and which do not produce toxic gases upon reaction. They are available in finely powdered form and are solid, stable, and substantially non-volatile below about 165°F which is the temperature to which they may be exposed in a closed automobile.

It is particularly preferred to employ potassium chlorate or potassium perchlorate since when these materials react with the organic fuels, the products of the reaction include potassium chloride in preference to potassium oxide. The potassium chloride at the temperature of the reaction is volatile and is in a vapor form that is conveyed to the gas bag to assist in inflation. When the gaseous mixture in the bag cools, the potassium chloride condenses, thereby substantially reducing the volume of gas and effecting a degree of deflation of the bag. Further, by preferentially forming potassium chloride instead of a potassium oxide, reaction with water is avoided which would produce potassium hydroxide which is sufficiently caustic to cause discomfort and possibly minor injury to a passenger in case of leakage from the bag. The potassium chloride produced in the reaction with the fuel is sufficiently stable that formation of potassium hydroxide is avoided.

Other oxygen bearing oxidizing powders are technically feasible for practice of this invention such as, for example, peroxides, superoxides, permanganates, nitrates and the like. Permanganates and nitrates are undesirable because of possible toxity and peroxides and superoxides are undesirable because extremely sensitive and therefore hazardous to mix with reducing materials.

The fuel or reducing powder employed is preferably an organic compound that is selected from those organic molecules having the formula $C_x,H_y,O_z$, where $x$, $y$ and $z$ are integers. Clearly this involves a broad class of sugars, starches, cellulose, and many other organic compounds of both natural and synthetic origin. There are, however, certain other limitations on the organic fuel that significantly reduce the class of suitable materials. The fuel must have a melting and decomposition point of greater than about 165°F so as to remain stable in the mixture under any temperature that it is likely to encounter in service up to the time of initiation. The fuel should not sublime to any significant extent up to abut 165°F since it is found that thermal cycling of a sublimable compound in the presence of the oxidizing agent reduces the quantity of gas that may be produced upon reaction of the mixture. It is believed that the vapor produced on sublimation is sufficiently active that partial reaction with the oxidizing material may occur upon thermal cycling, thereby reducing the quantities of material available for reaction upon initiation of the desired reaction. Further, the fuel should not sublime to any great extent prior to oxidation when deflagration reaction with the oxidizer is initiated.

The organic fuel must also be sufficiently friable or be producible by a process that yields an average particle size of less than about 15 microns. By average particle size is meant that no more than half of the particles have a size larger than about 15 microns. The surface properties of the organic fuel must also be such that significant agglomeration is prevented. Both the small particle size and the freedom from agglomeration are related to the reaction of the fuel with the oxidizer. If the partical size of the fuel is too large, the available surface area for reaction is reduced and the rate of reaction may not be sufficient for producing gases fast enough for inflation of an air bag in an automobile passenger restraint system. Similarly, if the organic fuel agglomerates, intimate mixture with the oxidizing material becomes difficult and the reaction rate may be decreased or become erratic.

The organic fuel should be substantially free of nitrogen, fluorine and sulfur so that no noxious or toxic compounds are generated upon deflagration. Similarly, the other ingredients in the composition, oxidizer, coolant, and catalyst as described hereinafter should be free of such elements as would yield toxic reaction products. Preferably, the fuel is not a relatively strong acid since this leads to storage problems, however, with proper materials' selection for the containers, acids such as oxalic acid, propanediolic acid, and glyoxylic acid can be employed. Preferably, the fuel is selected from the class consisting of sucrose, starch, cellulose, dextrose, dextrin, fructose, lactose, ascorbic acid, benzoic acid, maltose monohydrate, mannitol, mannoheptose, and mannoheptose monohydrate.

Particularly preferred fuels are sucrose, starch, and cellulose. These materials are particularly preferred since they are readily commercially available in a suitable particle size and are of very low cost. A very convenient and particularly preferred fuel is a mixture of about 97 percent sucrose and 3 percent cornstarch, which is commercially available as ordinary powdered sugar. This composition is relatively free of agglomeration and caking and can therefore be mixed readily with the oxidizer powder. Another particularly preferred fuel is starch which is readily available as a fine powder and has a higher melting point than sucrose, thereby apparently producing a smaller quantity of carbon monoxide upon combustion.

The oxidizer powder preferably has an average particle size less than about 25 microns so that the reaction rate with the fuel is rapid and complete. If the particle size is greater than about 25 microns unreacted particles may be ejected with the gaseous reaction products. It is particularly preferred that the oxidizer have an average particle size less than about 15 microns and the fuel have an average particle size less than about 5 microns in order to obtain a very rapid reaction therebetween. When the particle size is larger than about 5 microns for the fuel, the time required for complete reaction is increased and the rate of reaction is not quite as predictable since the fuel is the principal regulating factor in the oxidation-reduction reaction. It is also preferred that the particle size of the oxidizer and fuel be about the same, that is, that they not differ from each other by more than about 100 percent so that thorough and intimate mixture of the particles is obtained without substantial segregation. Segregation of the fuel and oxidizer leads to erratic burning and may yield an incomplete reaction.

It is preferred that the mixture be tamped or pressed into the container so as to be firmly in place. If loose powders are present in the container vibration in an automobile may cause particles of different densities or sizes to segregate, yielding erratic burning when ignited. It is, therefore, preferred that the mixture be tamped or pressed or otherwise compacted under pressure. It should be noted that vibration may effect compaction, however, the uncontrolled vibration in an automobile may cause segregation before effective compaction. The preferred compaction is sufficinet to prevent dislodging of more than minor amounts of powder from the surface of the compact, but is preferably less than about 5000 psi. Above about 5000 psi compaction pressure the effect on burning rate is pronounced and undesirable. When loose or lightly compacted powders are burned the maximum gas pressure is reached rapidly, typically in less than 1 millisecond. When the compaction pressure is over about 5000 psi, the burning rate is decreased and several milliseconds may be required to reach maximum gas pressure. The preferred maximum pressure of about 5000 psi is particularly applied to compositions including sucrose. The preferred maximum compaction may vary somewhat from this figure for other organic materials having higher or lower strength. It is particularly preferred that the proportion of oxidizer and fuel provide a stoichiometric reaction wherein the gaseous products produced consist primarily of carbon dioxide and water. Thus, for one example, a preferred composition would include 8 mols of potassium chlorate per mol of sucrose to yield the reaction $$C_{12}H_{22}O_{11} + 8KClO_3 \rightarrow 12CO_2 + 11H_2O + 8KCl.$$

A moderate degree of deviation from stoichiometry can be tolerated within principles of this invention. An excess of fuel above stoichiometry of about 10 percent can be employed. If the quantity of excess fuel is greater than about 10 percent over the stoichiometric proportion, there is insufficient oxygen in the combination of fuel and oxidizer and an undesirable quantity of toxic carbon monoxide may be generated. Preferably, the quantity of fuel is no more than about 6 percent below the stoichiometric proportion since the quantity of gas that is produced by the reaction is decreased and therefore, in order to obtain a sufficient volume of gas for inflating a bag to the desired pressure, an increased quantity of the reaction mixture must be provided. When an increased quantity can be tolerated, the fuel can be as much as 15 percent below stoichiometric proportion, and the reaction may proceed properly. When the proportion of fuel is more than about 15 percent below the stoichiometric proportion, the reaction rate may become erratic in absence of thorough mixing of the ingredients. The reaction may also be undesirably slow for some applications. With some embodiments the proportion of potassium chlorate may be as high as 95 percent by weight and the sucrose or starch may be 5 percent by weight and satisfactory results obtained. Such an embodiment generates substantial excess oxygen and is substantially entirely free of carbon monoxide.

In addition to an oxidizing powder or oxidizer and a reducing powder or fuel, the composition preferably contains in intimate admixture therewith an endothermic decomposition coolant powder having gaseous decomposition products selected from the class consisting of carbon dioxide and water. The coolant decomposes endothermically from the heat of reaction between the fuel and oxidizer. The coolant provides multiple functions in the gas generator. The coolant provides additional gaseous products, namely, carbon dioxide or water vapor, or both, so that the additional gas volume assists in inflation of the gas bag. The endothermic decomposition serves to cool the reaction products of the reaction between the fuel and oxidizer so that the gases used for inflating the bag are at a lower temperature and the likelihood of injuring a passenger in case of a leak in the bag is minimized. When the coolant powder is intimately mixed with the fuel and oxidizer, the endothermic reaction tends to reduce the rate at which gas is produced so that the time/pressure history of gas generation can be adjusted as desired. Thus, if the gas is generated too rapidly, an increased quantity of coolant powder can be added to the mixture so that the rate at which gas is produced is decreased or the time interval during which gas is produced is increased.

If it is desired only to obtain an additional volume of gas and to provide cooling of the gases without affecting the rate of gas production from the oxidation-reduction reaction, the endothermic coolant can be provided in close proximity to the reaction mixture without being intimately mixed therewith. Thus, for example, referring to the drawing, there is shown in phantom a dividing line between a body 17a of a mixture of fuel and oxidizer and a body 17b of coolant powder compacted together. In such an arrangement, the gas generated by reaction of the body 17a mingles with and rapidly heats the powders of the coolant body 17b, causing endothermic decomposition for increasing the quantity of gas produced and decreasing the temperature of the gas without decreasing the rate that gas is produced from the body 17a.

With such a multiple body arrangement of compositions within the principles of this invention, a variety of pressure/time histories can be tailored to meet specific requirements. Thus, for example, the first body 17a may include fuel, oxidizer and a small amount of coolant in order to modulate the rate of reaction, and the coolant body 17b may include oxidizer and fuel and a much larger proportion of coolant in order to obtain a much slower reaction for more sustained inflation. It will be apparent to one skilled in the art that the relation of the two bodies can be reversed so that the relatively slower reaction may be in the position of the body 17a and the faster reaction in the position of the body 17b. It will also be apparent that relatively faster and slower reaction bodies of compositions can be arranged concentrically or in other patterns for obtaining a desired pressure/time history.

The endothermic decomposition coolants are preferably selected from the class consisting of carbonates, bicarbonates, and hydrates of inorganic compounds. The class of preferred coolants is further limited in that decomposition should not occur below about 165°F, nor any temperature too close to the temperature of the oxidation-reduction reaction. That is, the temperature of decomposition is well below the reaction temperature and above about 165°F. It is also desirable that the energy required for decomposition be relatively low so that the quantity of gas that is produced upon decomposition is high without the coolant being excessively endothermic. It is also important that the metallic materials in the coolant have sufficiently stable oxides that caustic hydroxides are not produced, which could lead to injury of passengers in case of a leak in the bag. The coolants should not enter into side reactions with the other portions of the composition at the temperature of the reaction. Thus, for example, they should not form slags with salts from the oxidation-reduction reaction since this could lead to ejection of hot particles into the gas bag.

Preferably, the coolant powder is selected from the class consisting of magnesium carbonate, manganese carbonate, zinc carbonate, barium carbonate, calcium carbonate, potassium bicarbonate, hydrated magnesium carbonate (magnesium carbonate trihydrate or magnesium carbonate pentahydrate), hydrated zirconium oxide (zirconium hydroxide), borax (hydrated sodium borate), and barium oxide octahydrate. If it is acceptable to have a caustic hydroxide as a reaction product, sodium carbonate and sodium bicarbonate are suitable coolants.

The coolant preferably has an average particle size less than about 15 microns so that decomposition occurs rapidly and reliably and also, if the coolant is intimately admixed with the oxidizer and fuel, the particle size is in the same range as those of the oxidizer and fuel so that homogenity is obtained.

It is preferred that the quantity of coolant powder be present in an amount less than about 1:1 relative to the total quantity of fuel plus oxidizer. This proportion is stated in terms of weight of materials so that, for example, in a 60 gram gas generator, 30 grams may be a stoichiometric mixture of fuel and oxidizer and 30 grams may be a coolant. If the coolant is hydrated magnesium carbonate, it is preferred that the weight of coolant be in the proportion of no more than about 1:2 relative to the weight of oxidation-reduction reaction mixture. This is preferred, since decomposition of such a hydrated coolant is much more endothermic than decomposition of magnesium carbonate, for example, and excessive cooling of the gases generated may occur.

A particularly preferred coolant is zinc carbonate which decomposes substantially completely to zinc oxide and carboon dioxide.

It has also been found that the rate of the oxidation-reduction reaction can be enhanced by addition of a decomposable metal oxide catalyst. Preferably, the catalyst is selected from the class consisting of ferric oxide and cupric oxide which readily decompose with production is highly active oxygen at the temperature of the reaction. Other catalyst oxides having decomposition temperatures approximately that of ferric oxide may also be suitable.

Thus, for example, catalysts may also be selected from the following group: barium peroxide, bismuth trioxide, bismuth pentoxide, calcium ferrite, calcium peroxide, calcium oxide peroctahydrate, ferroscoferric oxide, hydrated ferric oxide, magnesium peroxide, manganese dioxide, manganese sequioxide, manganese (II, III) oxide ($Mn_3O_4$), molybdenum oxides, potassium peroxide, potassium trioxide, potassium superoxide, sodium peroxide, tungsten trioxide and zinc peroxide.

Preferably, the catalyst has an average particle size less than about 10 microns in order to most effectively enhance the reaction rate. The catalyst is also preferably present in an amount less than about 5 percent of the oxidation-reduction reaction mixture (it will be recognized that the oxygen of the catalyst may substitute for oxygen from the oxidizer in determining stoichiometry of the reaction mixture). If the quantity of catalyst is greater than about 5 percent, a sufficient quantity of non-volatile metals or metal oxide may be present that residual hot particles remain in the gas generator or are passed into the inflatable bag and such hot non-gaseous products are quite undesirable. Higher quantities of some of the less stable catalysts may make the mixture too sensitive for safe handling and storage. The catalysts, even though oxygen bearing, are distinguished from the oxidizers in that the products of reaction are not generally volatile at the temperature of the reaction.

When the gas generated by the gas generator flows to the gas bag, it is at a sufficiently high temperature that the water is in the form of vapor and the carbon dioxide is substantially expanded above its volume at room temperature. Potassium chloride is also in vapor form and helps inflate the bag. Rapid deflation of the gas bag is obtained as heat is lost from the gas that is in the bag and the temperature falls. The volume of carbon dioxide decreases as this gas contracts upon cooling. The volume of water vapor and potassium chloride vapor decreases rapidly as heat is lost since the water and salt condenses with a very great change in volume. It will also be noted that the heat loss required for condensation of the water is greater than the heat loss for contraction of carbon dioxide.

With these factors in mind and with the known energy and volume relations of the reaction and subsequent cooling and condensation, the rate of deflation of the gas bag and its final volume when deflation is completed is readily adjusted by varying the proportion of carbon dioxide and water vapor in the products of the reaction. These proportions can be adjusted to a small extent by appropriate selection of the organic fuel since the ratio of carbon to hydrogen varies in the suitable fuel to some extent. A greater variation in the proportion of carbon dioxide to water vapor can be obtained by proper selection of the coolants that are used.

Thus, for example, if a carbonate is employed as the coolant, decomposition yields carbon dioxide in the gaseous mixture. If, on the other hand, a hydrated metal oxide, such as barium oxide or zirconium oxide is employed, only water vapor is added to the gas in the bag. If hydrated magnesium carbonate is used, both water and carbon dioxide result from decomposition. It will be apparent that any desired addition of carbon dioxide or water vapor, or both, is readily obtained by selection of an appropriate coolant or coolants.

The composition provided in practice of this invention has both high speed and low speed conflagration or burning rates depending on ignition characteristics. If a body of the composition is arranged in a cup or the like, having a closed end and an open end and ignition is provided at the open end, the reaction proceeds slowly and many seconds are required to complete the reaction. If on the other hand, ignition is from the closed end, the reaction proceeds rapidly and peak pressure may be reached in less than a millisecond with completion of reaction being measured in milliseconds. Thus there is a difference of two or three orders of magnitude in the burning rate depending on the point of ignition. It is believed that the difference probably arises from hot gas from prior combustion flowing through the compacted powders in advance of the flame front so that the mixture is preheated towards its autoignition temperature. If the mix is ignited from the open end, the gases generated flow out without heating additional powder. If, as pointed out elsewhere herein, the mixture is compacted with a pressure in excess of about 5000 psi, the reaction rate is decreased. This may be due to reduction in permeability of the compact and hence decreased gas flow.

If the body of compacted powder in the cartridge is continuous, hot gases through the entire body and very rapid reaction is obtained. There is, therefore, provided a passage 18 through the compact which permits flow of hot gases produced by the reaction. As the diameter of the passage is increased, more of the gas flows through it and less through the powders, thereby slowing the reaction. This decrease is, to some extent, offset by increased depth of compacted powder in order to obtain the required quantity of composition for producing a desired gas volume. It will also be noted that variations of the length to diameter ratio of the body of compacted powder also has an effect on the over-all pressure/time curve. If desired, a plurality of passages through the body of compacted powders can be used.

Thus there are several means for controlling the pressure/time pattern of the gas generator including variation in length to diameter ratio, control of passage cross section through the compacted powders, degree of compaction of the powders, and addition of endothermic decomposition coolant powders to the mixture of fuel and oxidizer. These can be used individually or in combination as desired to obtain the desired pattern. The use of an endothermic coolant has the added advantages of cooling the reaction gases and adding to the volume of gas. The coolant also provides control of gas composition. These latter features are obtained whether the coolant is mixed with the fuel and oxidizer or is in the form of a separate body.

This is to be contrasted with other gas generating compositions such as black powder and single and double base propellants. With such materials the rate of reaction and hence pressure/time curve is nearly independent of the point of origin of the reaction. Thus, the rate for black powder is about the same in a cup whether it is ignited from the open or closed end. Control of rate of gas generation by providing a passage through the powder is not available with materials wherein the burning rate is substantially the same independent of ignition conditions. In other compositions the pressure/time pattern is controllable only by complex geometries, such as providing several isolated bodies with interconnecting powder trains or in some cases by use of diluents.

FIG. 2 illustrates another embodiment of gas generator cartridge constructed according to principles of this invention. As illustrated in this embodiment, there is a cup like cylindrical steel housing 26 having wrench flats 27 near the closed end so that the cartridge can be screwed down tightly onto a gas distribution arrangement such as provided in the aforementioned copending application. In order to make such a connection the open end of the housing 26 has internal threads 28. At the principally closed end of the housing 26 is a conventional bridge wire initiator 29 for igniting a pyrotechnic mixture 31 contained within the housing. The pyrotechnic mixture 31 is preferably a stoichiometric mixture of potassium chlorate and sucrose for complete reaction to produce substantially completely carbon dioxide and water vapor and potassium chloride. Other compositions hereinabove described may be employed as desired. Typically, about 60 grams of the pyrotechnic mixture 31 would be contained in the housing for inflating a standard size air bag.

The powder 31 is preferably placed into the bore and pressed into place at a pressure of up to about 5000 psi.

A plastic, metal, or synthetic mica diaphragm 32 (preferably mica) is sealed, such as by cementing, inside the bore of the housing 26 to provide a hermetic seal for the pyrotechnic composition 31. A second diaphpragm 33 is provided between the threaded portion 28 and the bore of the housing and typically is held in place when the cartridge is threaded onto the gas distribution system or may be cemented in place as desired. Between the two diaphragms 32 and 33 is about 30 grams of water 34. The space between the two diaphragms may be sized so that it is substantially completely filled with water if desired, or a small ullage may be provided if desired.

When the bridge wire initiator 29 ignites the pyrotechnic mixture 31 in the gas generator cartridge a large amount of relatively hot carbon dioxide and water vapor are produced. These gases mingle with the water 34, thereby cooling the hot gases and vaporizing the water. If the second diaphragm 33 is slightly stronger than the first diaphragm 32 and a small ullage is provided, some comingling of the gas with the water may occur before substantial ejection of water from the gas generator cartridge commences. Since the heat of vaporization of water is quite high, substantial cooling of the gases occurs and a large volume of water vapor is produced. It has been found with such an arrangement that rapid and full inflation of a passenger restraint bag is obtained on a regular basis. Because of the large proportion of water vapor condensation results in rapid and rather thorough deflation of the air bag as heat is lost to and through the bag.

By using water directly as a coolant for the gases, an additional advantage is obtained in that ejection of hot particles from the gas generator is substantially completely inhibited. Typically, in operation of a passenger restraint bag wherein inflation is obtained from a pyrotechnic mixture alone, tiny perforations due to burns through the bag material are often observed. In one series of tests, the same passenger restraint bag was inflated 25 times with a gas generator cartridge like that illustrated in FIG. 2, and even after that many tests no evidence whatsoever of burns could be found in the bag.

EXAMPLES

Several different tests have been performed in varying stages of complexity for evaluation of compositions embodying principles of this invention. For all such tests, mixtures of the various powders are made by weighing the ingredients in the desired proportions, followed by mixing. Mixing is obtained by sieving the powders together three times through a fine sieve. The sieving intimately mixes the powders and minimizes agglomeration. Sieving more than three times is avoided for minimizing segregation and consequent inhomogeneity. After mixing, the desired quantity of mixture is weighted for the test to be conducted.

The most comprehensive test involves inflation of an actual gas bag, such as employed in an automobile passenger restraint system, and using a gas generator such as described and illustrated in the aforementioned copending patent application. In such a test, 60 grams of the composition is tamped into a gas generator cartridge 12 and a cartridge is installed on a gas generator as described in the copending application. With a gas bag in place, an electric signal is applied to the initiator which starts the reaction in the gas generator cartridge, and the resultant gases flow through the gas generator and inflate the bag. The time required for inflation and subsequent deflation of the bag is noted, as well as the general performance of the system. Examination of residues in the gas generator, the cartridge and in the bag indicates completeness of reaction, presence of side reactions and the like.

A pressure sensor arranged near the gas generator cartridge, but out of a direct line therewith is useful for measuring pressure in the gas generator as a function of time, thereby indicating reaction rates. Hereinafter, such a test may be referred to as a "bag test".

A slightly less comprehensive test is identical to the bag test except that an insulating frangible tape is provided across the orifice typically employed for inflating a bag. A frangible electric conductor is provided on the tape. The signal to the initiator and the conductor on the tape are both connected to a conventional oscilloscope or the like. The signal to the initiator starts a timing cycle that ends on rupture of the frangible conductor. Measurement of this time interval indicates the reaction rate from initiation to the initial pressure rise due to the reaction. By comparing the rise time so obtained with data from bag inflation tests, the performance of a composition in a bag test can be rather accurately predicted at a considerably lower cost than an actual bag test. Hereinafter, this test may be referred to as a "tape test".

Further evaluation is obtained in both the tape test and bag test by examining the chamber in which the reaction occurs and the gas distribution system, for the presence of unburned mixture or undesirable residues.

A third type of test approaches the tape test but is more subjective and considerably less expensive. According to this procedure, from 10 to 20 grams of a mixture is hand tamped into a gas generator cartridge or similar metal cup and the mixture is ignited from the forward side with a hand torch or the like. The rate and mode of burning of the mixture and the presence of undesirable residue is observed. In such a test, one can observe whether burning proceeds rapidly and uniformly and whether undesirable hot particles are ejected. Since the burning rate is relatively low with the front ignition, visual observation is used. By comparison of compositions under evaluation with compositions of known burning characteristics, a reliable estimation of performance in the more expensive test can be obtained. Hereinafter, such a test may be called a "cap test".

A quite satisfactory screening test for mixtures of different materials and different proportions of materials involves simply piling from about 1 to 2 grams of a candidate composition on a piece of paper which is then ignited at an edge. The flame from the burning paper is sufficient for ignition compositions suitable for practice of this invention and the burning rate and characteristics and to some extent accumulation of undesirable residues can be observed quite economically. Hereinafter, such tests may be referred to as a "paper test".

The following pyrotechnic mixtures have been tested by burning on paper as described hereinabove and all were judged to perform satisfactorily:

| Sucrose* (%) | Potassium Chlorate (%) | Other (%) | |
|---|---|---|---|
| 25 | 75 | — | |
| 32 | 68 | — | |
| 20 | 80 | — | |
| 12.5 | 37.5 | 50 | ZnCO$_3$ |
| 16.6 | 50.0 | 33.4 | ZnCO$_3$ |
| 14.4 | 42.9 | 42.9 | ZnCO$_3$ |
| 20 | 60 | 20 | MnCO$_3$ |
| 12.5 | 37.5 | 50 | MgCO$_3$. xH$_2$O** |
| 16.6 | 50 | 33.4 | MgCO$_3$. xH$_2$O** |
| 20 | 60 | 20 | ZrO$_2$. 2H$_2$O |

*Sucrose as used for these and other tests comprises about 97% sucrose and 3% starch for inhibiting caking.
** x appeared to be between 3 and 5.

The following pyrotechnic mixtures have been subjected to the above described cap test and were judged to have performed satisfactorily:

| Sucrose* (%) | Potassium Chlorate (%) | Other (%) | |
|---|---|---|---|
| 25 | 75 | — | |
| 20 | 60 | 20 | ZnCO$_3$ |
| 12.5 | 37.5 | 50 | MgCO$_3$.5H$_2$O |
| 12.5 | 37.5 | 50 | ZnCO$_3$ |
| 16.7 | 50 | 33.3 | MgCO$_3$.5H$_2$O |
| 16.7 | 50 | 33.3 | ZnCO$_3$ |
| 20 | 60 | 20 | CaCO$_3$ |
| 16.5 | 53.5 | 30 | CaCO$_3$ |

The following pyrotechnic mixtures were tested according to the tape test described hereinabove and were satisfactory:

| Sucrose* (%) | Potassium Chlorate (%) | Other (%) | |
|---|---|---|---|
| 25 | 75 | — | |
| 20 | 60 | 20 | ZnCO$_3$ |
| 20 | 60 | 20 | MgCO$_3$.5H$_2$O |

The following pyrotechnic mxtures have successfully inflated bags in bag test conducted as set forth hereinabove:

| Sucrose* (%) | Potassium Chlorate (%) | Other (%) | |
|---|---|---|---|
| 20 | 80 | — | |
| 25 | 75 | — | |
| 32 | 68 | — | |
| 25 | 74 | 1 | Fe$_2$O$_3$ |
| 32 | 67 | 1 | Fe$_2$O$_3$ |
| 20.8 | 62.5 | 16.7 | ZnCO$_3$ |
| 20 | 60 | 20 | ZnCO$_3$ |
| 19.2 | 57.8 | 23 | ZnCO$_3$ |
| Starch (%) | | | |
| 10 | 90 | — | |
| 13 | 87 | — | |
| 20 | 80 | — | |
| 25 | 75 | — | |
| 15 | 60 | 25 | MgCO$_3$ |
| 14 | 56 | 30 | MgCO$_3$ |
| 10 | 40 | 50 | MgCO$_3$ |
| 15 | 60 | 25 | MgCO$_3$.5H$_2$O |
| 14 | 56 | 30 | MgCO$_3$.5H$_2$O |
| 10 | 40 | 50 | MgCO$_3$.5H$_2$O |
| 15 | 60 | 25 | ZnCO$_3$ |
| 14 | 56 | 30 | ZnCO$_3$ |
| 10 | 40 | 50 | ZnCO$_3$ |
| 13⅓ | 53⅓ | 33⅓ | Borax |

*Sucrose as used for these and other tests comprises about 97% sucrose and 3% starch for inhibiting caking.

As mentioned hereinabove numerous bag tests have been made with a stoichiometric mixture of sucrose and potassium chlorate adjacent a body of water. These tests uniformly resulted in excellent bag inflation and deflation.

The gas generated upon reaction of sucrose and potassium chlorate in substantially the stoichiometric proportion has been measured. In this test, the reaction mixture was ignited in a conventional test bomb wherein the combustion products are trapped.

The gas analysis was run after the reaction products had cooled so that vaporized potassium chloride and water had condensed. A gas chromatograph having a sensitivity of about 50 parts per million was employed for the analysis. It was found that the gas obtained by this combustion was 6.5 percent air, 0.23 percent carbon monoxide, about 100 parts per million NO$_2$ with the balance being carbon dioxide. No other gases were detected in the sample. It will be recognized that the combustion products are not toxic or noxious.

In another test a substantially stoichiometric mixture of sucrose and potassium chlorate was used for inflating a bag. The residual gas in the bag was analyzed and found to constitute 11.2 percent carbon dioxide, 20 percent oxygen and 68.3 percent nitrogen. Minor quantities, expressed in parts per million of the following gases were also found: nitrogen oxides (NO$_x$)—182; methane—75; acetylene—32; ethylene—6; carbon monoxide—1500. Hydrogen cyanide and chlorine were both less than 10 ppm., the approximate sensitivity of the analysis techniques. Sulfur dioxide was less than 1 ppm. Other hydrocarbons totaled 3370 ppm. expressed as methane equivalent and probably included a minor amount of unburned sucrose and molecular fragments thereof.

It is to be understood that the above described examples are merely illustrative of application of principles of this invention. It will be apparent to those skilled in the art that many other modifications and variations can be made. It is therefore to be understood that within the scope of the appended claims the invention may be practiced otherwise than as specifically described.

What is claimed is:

1. A deflagration composition for generating a gas comprising principally carbon dioxide and water vapor comprising a substantially homogeneous mixture of:

an oxygen bearing oxidizing powder having an average particle size less than about 25 microns; selected from the group consisting of potassium chlorate, potassium perchlorate sodium chlorate, and sodium perchlorate;

an organic reducing powder selected from the group consisting of sucrose, starch, cellulose, dextrose, dextrin, fructose, lactose, ascorbic acid, benzoic acid, maltose monohydrate, mannitol, mannoheptose, mannoheptose monohydrate, oxalic acid, propanediolic acid and glyoxylic acid, the organic reducing powder having an average particle size less than about 15 microns and solid below about 165°F, the proportion of oxidizing and reducing powders being sufficiently near stoichiometry to produce a gas upon deflagration comprising principally carbon dioxide and water vapor and an inorganic salt that is volatile at the temperature of deflagration and free of substantial carbon monoxide, nitrogen compounds, sulfur compounds and fluorine compounds; and an endothermic decomposition coolant powder having an average particle size less than about 25 microns and having a thermal decomposition product selected from the class consisting of carbon dioxide and water and substantially free of ions or radicals that react with the inorganic salt during deflagration, the coolant powder being selected from the group consisting of magnesium carbonate, zinc carbonate, hydrated magnesium carbonate, borax and hydrated salts of metals having oxides stable in the presence of water, and wherein the proportion by weight comprises about one part reducing powder, three parts oxidizing powder, and from one to four parts coolant powder.

2. A gas generating composition as defined in claim 1 wherein the reducing powder is selected from the group consisting of starch and about 97 percent sucrose with about 3 percent starch, the oxidizing powder comprising potassium chlorate, and the coolant powder is selected from the group consisting of magnesium carbonate and zinc carbonate in a proportion of one part by weight per part by weight of reducing powder and oxidizing powder.

3. A composition of matter comprising an intimate mixture of:

a fuel powder having an average particle size less than about 15 microns and selected from the class consisting of sucrose, starch, cellulose, dextrose, dextrin, fructose, lactose, ascorbic acid, benzoic acid, maltose monohydrate, mannitol, mannoheptose, mannoheptose monohydrate, oxalic acid, propanediolic acid, and glyoxylic acid;

an oxidizer powder having an average particle size less than about 25 microns and selected from the class consisting of potassium chlorate, potassium perchlorate, sodium chlorate, and sodium perchlorate; and a coolant powder having an average particle size less than about 15 microns and selected from the class consisting of magnesium carbonate, magnesium carbonate trihydrate, magnesium carbonate pentahydrate, manganese carbonate, zinc carbonate, barium carbonate, sodium carbonate, sodium bicarbonate, potassium carbonate, potassium bicarbonate, zirconium hydroxide, and barium oxide octahydrate; and wherein the proportion of fuel powder to oxidizer powder is in the range of from about 15 percent deficient fuel to 10 percent excess fuel relative to the stoichiometric proportion wherein all of the carbon and hydrogen in the fuel would react with the oxygen in the fuel and oxidizer to carbon dioxide and water;

the proportion of coolant powder is less than about 50 percent by weight of the composition; and the composition is compacted together by a pressure less than about 5000 psi.

4. A composition as defined in claim 3 wherein the fuel powder is selected from the class consisting of sucrose and starch, the oxidizer powder is selected from the class consisting of potassium chlorate and potassium perchlorate and the coolant is selected from the class consisting of magnesium carbonate, manganese carbonate, zinc carbonate, hydrated magnesium carbonate, and barium oxide octahydrate, and the proportion of fuel powder to oxidizer powder is in the range of from about 6 percent deficient fuel to 6 percent excess fuel.

5. A composition as defined in claim 4 further comprising up to about 5 percent of catalyst selected from the class consisting of ferric oxide and cupric oxide, and having an average particle size less than about ½ micron.

6. A composition as defined in claim 4 wherein the fuel powder is selected from the group consisting of starch and about 97 percent sucrose with 3 percent starach, the oxidizer powder comprises potassium chlorate, and the coolant powder is selected from the class consisting of magnesium carbonate and zinc carbonate in a proportion of about 20 percent by weight of the total composition.

* * * * *